(12) United States Patent
Walter

(10) Patent No.: US 6,768,076 B2
(45) Date of Patent: Jul. 27, 2004

(54) PRECISION BASE AND FIXTURE ADAPTER SET-UP

(76) Inventor: Joseph M. Walter, 164 Peppermint Rd., Lancaster, NY (US) 14086

( * ) Notice: Subject to any disclaimer, the term of this patent is extended or adjusted under 35 U.S.C. 154(b) by 0 days.

(21) Appl. No.: 10/144,980

(22) Filed: May 15, 2002

(65) Prior Publication Data

US 2003/0213776 A1 Nov. 20, 2003

(51) Int. Cl.[7] .............................. B23H 11/00; B23Q 3/06
(52) U.S. Cl. ................................ 219/69.11; 219/69.12; 269/309
(58) Field of Search ........................... 219/69.12, 69.11; 269/309, 900

(56) References Cited

U.S. PATENT DOCUMENTS

| | | | | |
|---|---|---|---|---|
| 4,630,811 A | * | 12/1986 | Rudisill | 269/900 |
| 4,786,776 A | * | 11/1988 | Ramsbro | 219/69.12 |
| 4,794,687 A | * | 1/1989 | Peters et al. | 269/900 |
| 4,822,014 A | * | 4/1989 | Buchler | 269/309 |
| 4,824,088 A | * | 4/1989 | Siegel | 269/309 |
| 5,501,437 A | * | 3/1996 | Kisslig | 269/900 |
| 5,562,277 A | * | 10/1996 | Swann et al. | 269/900 |
| 5,788,225 A | * | 8/1998 | Iwata et al. | 269/900 |
| 6,350,080 B1 | * | 2/2002 | Do et al. | |
| 6,511,574 B2 | * | 1/2003 | Barringer et al. | |

* cited by examiner

Primary Examiner—Geoffrey S. Evans
(74) Attorney, Agent, or Firm—Hodgson Russ LLP

(57) ABSTRACT

A base and fixture adapter set-up comprising a bas. The base comprising a main locating surface, an alignment surface, and a second solid surface or stop edge. A compound angle hole in the base for accommodating a clamping bolt and an adapter comprising a corresponding claiming bolt hole. As the clamping bolt is tightened the adapter contacts the main locating surface, then the alignment surface, and finally the stop edge. The adapter for connecting to a plurality of fixtures.

16 Claims, 3 Drawing Sheets

PRECISION BASE AND FIXTURE ADAPTER SET-UP

BACKGROUND OF THE INVENTION

This system offers rigid clamping and ultra precision locating that would be required in a precision manufacturing process. The clamping pressure will not pry or lift the alignment base as do other systems. The receiving surface is in clear view of the operator which makes the task of assuring perfect cleanliness an easier job to the system user. This cleanliness is a directly reflective of locating precision.

DESCRIPTION OF THE PRIOR ART

In U.S. Pat. No. 4,786,776 to Ramsbro, the design of a dovetail with a short dimension in height could be lifted from the table slightly during clamping. The clamping pressure could act as a pry which would cause this lifting action. This patent shows that it is possible to have machine dirt trapped down in the dovetail out of the clear view of the operator. This dirt could cause locating interference. Due to the extreme accuracy requirements that are commonly required by the type of manufacturing that would apply themselves to this kind of tooling system, for example wire electrical discharge machining, any location inaccuracies would place the results out of the commonly accepted parameters.

SUMMARY

The present precision base and fixture adapter set-up system is designed with concern of clamping pressures that draw components together rather than components that may wedge and split the alignment surfaces. Also in this design, the height of the fixture assembly is kept to a minimum to help prevent possible interference during machining operations. This interference would cause the operator to have to move the guides of, for example a wire electrical discharge machine, farther apart. These guides support the cutting tool (the cutting wire) in the machine and the closer they can be kept to the workpiece, the easier it will be to achieve improved accuracy.

In the design of the base, care was taken in determining the material thickness required under the screw heads used, so that the base would be securely held to the machine surface. Also, by using a group of fastening screws to secure the base to the machine, holding pressure is increased and spread across a larger area of the tool. The base, which is heat treated and precision ground, provides for extreme accuracy and wear resistance resulting in long reliable service. With the locating surface of the base facing the operator the operator always has clear view of any dirt or interfering particles that could change the location of the adapters when the adapters are clamped to the base.

The base is designed with a main locating surface that will support and hold the adapter in perfect parallel with the table surface of the machine. The main locating surface is also of proper flatness to assure that a tilting effect does not occur when the mating surface of the adapter is clamped directly to the main locating surface of the base. A threaded mounting hole is provided in the main locating surface of the base and is set at a compound angle. This angle setting assists in the clamping of the adapter to the base. This clamping offers repeatability of the parts to be machined in the first axis or what is identified on the machine as the "Z" axis.

A second surface, extending from the main locating surface of the base, acts as an alignment edge and contacts the adapter during the clamping process. This alignment edge will bring the adapter with the fixture mounted to it in perfect true with the second axis of the machine tool.

As the clamping pressure continues, the adapter then will come in contact with the third and final edge of the base. This contact surface identifies the final requirement of a complete location of three axis repeatability. This complete focus on assuring repeatability in all axes is the manner by which quality manufacturing can be performed with perfect duplication from part to part or set-up to set-up.

The design of this adapter is to allow the operator to mount a variety of fixtures to same. This flexibility the adapter offers enables an operator to hold fixtures for round parts, tall parts, thin parts, or even multiple parts. The adapters with the fixtures already mounted to them can be switched in and out of the machine tool with a minute of down time. This quick changeover makes an operation more profitable and flexible.

DETAILED DESCRIPTION OF THE INVENTION

Now the invention will be more completely described in connection with FIGS. 1, 2, 3a and 3b. FIGS 3a and 3b show the base 30 and the adaptor 37 and the arrangement of each before the adaptor 37 is clamped to the base 30. It is noted that the main concerning factors of this invention function in a wide variety of sizes.

Figure 1:
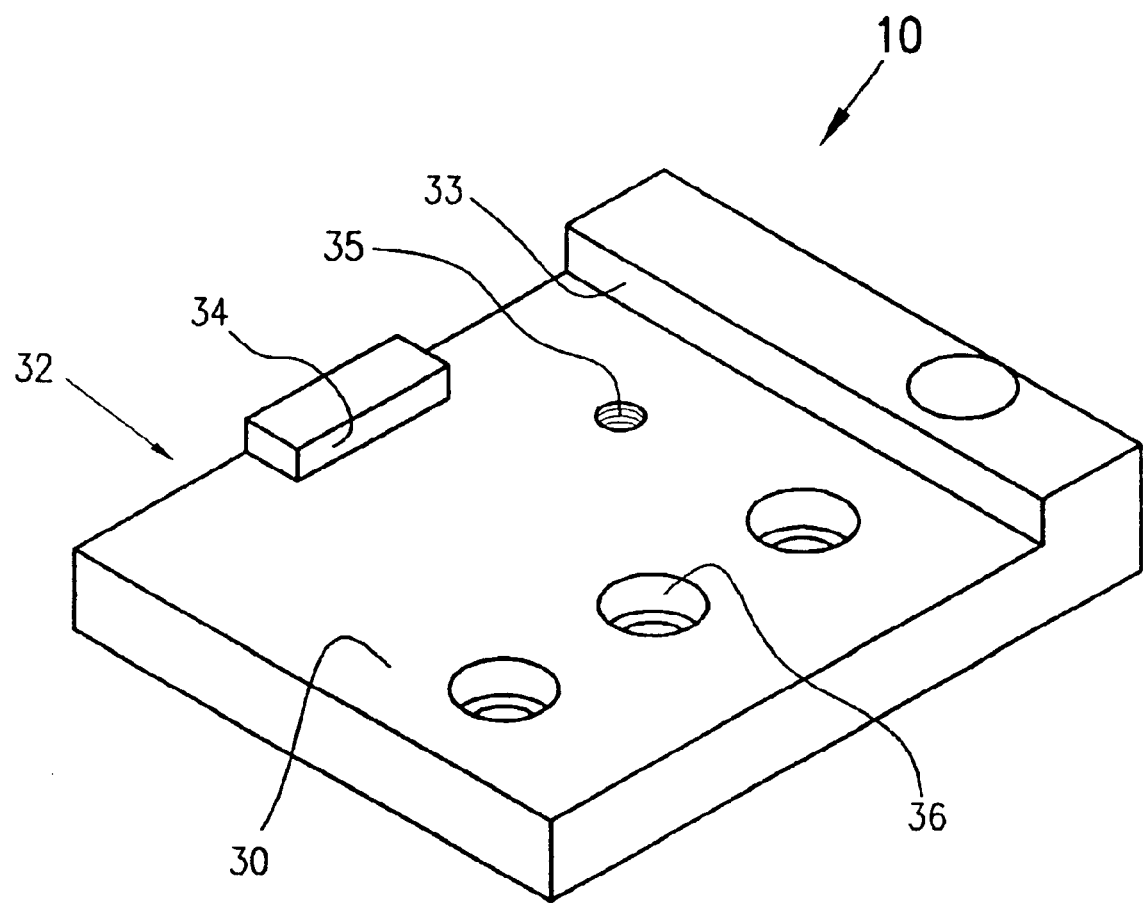
FIG. 1 shows a perspective view of the base 30 The main locating surface 32 of the base 30 is the area that the fixture adapter 37 will attach to during mounting. The alignment surface 33 is the edge that appoints true alignment of the fixture being mounted.

FIG. 1 shows a perspective view of the base 30 which defines multiple holes 36, the multiple holes 36 for receiving screws (not shown) for mounting the base 30 to a machine table (not shown). These mounting holes 36 are located in a way that they are alignable with the locations of the machine table holes (not shown). In the design of these multiple or fastening holes 36, the focus is to have ample base 30 material thickness to be under the screw head to supply sufficient holding strength of the base 10 to the machine table. The threaded mounting hole 35 in the main locating surface 32 of the base 30 is set at a compound angle. This angle setting assists in the clamping of the adapter 37 of FIG. 2 to the base 30. The main locating surface 32 is ground on a precision plain, parallel to the underside of the base 30.

The alignment surface 33 is a solid surface of the body extending upward from the main locating surface 32, and has a solid structure to assure rigidity during clamping. This alignment surface 33 is the second locating surface and when mounted to the machine tool, for example in a wire electrical discharge machine, will be indicated true. This step of indicating this alignment surface 33 will assure true alignment of the fixtures (not shown) when mounted to the adapter 37 shown in FIG. 2.

In FIG. 1 a second solid surface 34 extending upward from the locating surface 32 functions as a stop edge. This stop edge is the third and final edge of a complete and accurate locating pocket for accommodating the adapter 37.

The compound angle of the threaded mounting hole 35 is strategically located, enabling the adapter 37 to come in contact in proper sequence with the base 30. As the bolt (not shown) is being tightened through hole 38 of the adapter 37 into the threaded mounting hole 35 of the base 30, the clamping action will first cause the adapter 37 to come into contact with the main base surface 32. Then, as clamping continues the adapter 37 will come into contact with the alignment surface 33. Lastly, as the adapter 37 comes in contact with alignment surface 33, it will slide and come in contact with the second solid surface or final edge 34, which is the stop edge. Thus, three surface contact is achieved by a single clamping pressure, which results repeatability of adapter 37 attachment and removal.

Figure 2:
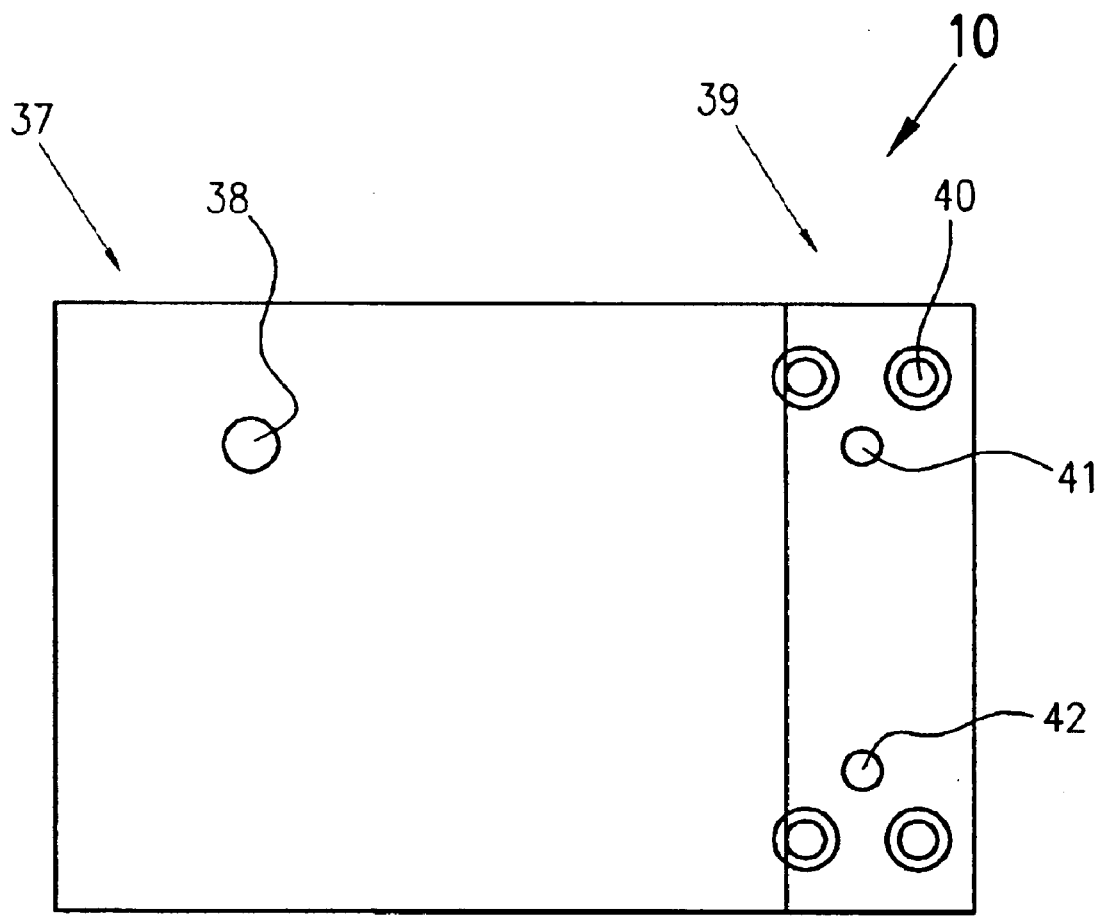
FIG. 2 shows a top plan view of the adapter 37. The fixture, which is used in holding the workpiece, mounts to the adapter 37. The reason for the use of an adapter is that the fixture required may vary, depending on the shape or size of the workpiece being processed. In some requirements a custom fixture may be required or fabricated to hold parts of unique shape or size.
Figure 3A:
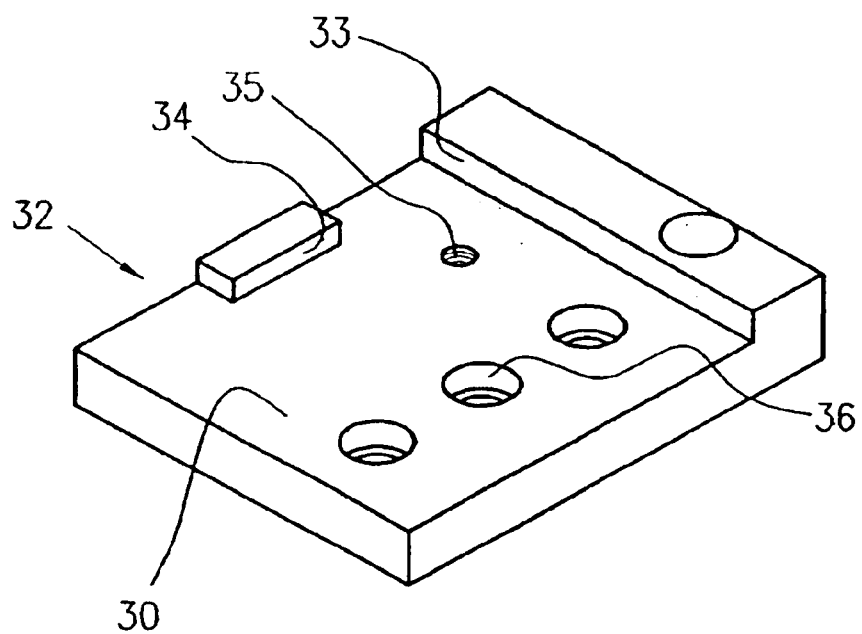
FIG. 3a shows a perspective view of the base 30.
Figure 3B:
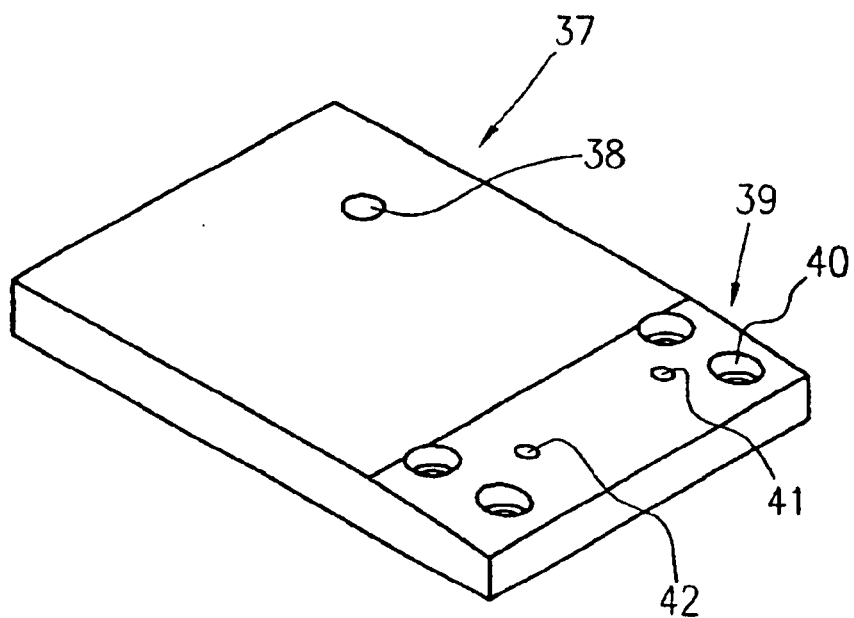
FIG. 3b shows a perspective view of the adaptor 37 that is clamped to the base 30.

FIG. 2 shows a top plan view of the adapter 37. This component designated the adapter 37 functions as a precision link between the fixture (not shown) being used and the locating pocket or base 30. This adapter 37 allows the manufacturing operation to have an endless number of fixtures mounted to adapters 37 all of which are properly aligned. The adapter 37 fixture assemblies are ready to be quickly mounted to the base 30 for instant use.

FIG. 2 shows the clamping location and bolt hole 38, this clamping location suited to fit. The clamping location is at a matching angle at a corresponding transferring location with the compound angle of the fastening hole 35 in the base 30. A threaded fastener to suit is used to fasten the adapter 37 to the base 30. This adapter 37 defines fixture mounting holes 40 to mount the adapter 37 to the fixture to be set up for future use. These fixture mounting holes 40 are set in a standard location in order to accommodate a wide range of fixtures.

FIG. 2 also shows location 41 which represents a pivoting location being held by a slip fit pivot pin. This pivoting action is needed to indicate the fixture accurately. To pivot the fixture to be mounted without a hammering action, a cam action pressure is applied by cam pin 42. By rotating the cam pin 42 the fixture will be pivoted in or out about the slip fit pivot pin at the pivoting location 41 until properly set. It is noted the adapter 37 is precision ground for smooth and reliable clamping.

Thus, a precision holding system useable in manufacturing processes comprising a base 30 that is mounted to the table of a machine tool, in particular, a wire electrical discharge machine is provided.

The base 30 is a precision component with a main locating surface 32 that is ground with extreme focus to the parallel requirement. This parallel requirement assures the workpiece true to the machine table.

Multiple mounting holes 36 for mounting the base 30 to the machine table assures solid mounting. Also, in using a series of mounting holes 36, the bolting will hold the base 30 to the table and maintain location, allowing for processes requiring repeatability.

It is noted the base 30 is of solid construction, and a surfaces and edges are manufactured from one part. Due to the structure of solid contact points provided by the base 30 for locating, repeatable accuracy is provided for when the adapter 37 is attached thereto. To assist in the repeatability, in the base 30 set at a predetermined compound angle is a threaded structure to properly hold the adapters 37 in place. The location and angle of the threaded structure causes a sequence of contacts to be made when the bolting process which joins the adapter 37 and the base 30 is executed.

The contact surfaces are constructed in a way to assure extreme true condition. These true surfaces are in relation to the clamping bolt, and as the clamping bolt is tightened it will first apply pressure to the main locating surface 32, this being the largest contact surface. Then as the clamping is continued, or in other words the clamping bolt is tightened, the pressure automatically moves the adapter 37 to come into contact with the next surface, this being the alignment surface or edge 33 of the base 30. As the final pressure is applied by the continued tightening of the clamping bolt, the adapter 37 is slid along the alignment surface 33 and moved into contact with the third and last edge, this being the stop edge or second solid surface 34.

The use of an adapter 37 allows quick interchange of an endless variety of fixturing. It is noted these adapters 37 define a mating clamp hole 38 that will hold the clamp bolt during clamping and as the above-described process occurs. To be a receiver of multiple fixtures a series of fastening holes or fixture mounting holes 40 are defined at the one end of the adapter 37, opposite to the end of the adapter 37 that attaches to the base 30 as shown in FIG. 2. There are a group of holes, one being the pivot point hole for truing the fixture to the axis movement of the machine tool. The second hole is a specific location to be used as a cam pin location for the cam pin 42. At this location rotating the cam pin 42 forces the fixture one way or the other to true the fixture.

Thus, the tooling set-up 10 allows a user to accurately interchange a wide variety of fixtures to be used in a high precision manufacturing process. With the use of the adapter 37 with standard mounting holes or fixture mounting holes 40, custom or standard fixtures could be linked to the machine tool with extreme accuracy in alignment. With three surface contacts (main locating surface 32, alignment surface 33, and second solid surface or stop edge 34) achieved by a single clamping pressure from the clamping bolt, extreme repeatability is built into the design. The design allows a manufacturer to create a more continuous work flow through its, for example, electrical discharge machine department.

What is claimed:

1. A fixture adapter set-up comprising:
   a) base;
   b) the base comprising a main locating surface, an alignment surface, and a second solid surface;
   c) the base defining a threaded mounting hole located in the main locating surface of the base, the threaded mounting hole at a compound angle; and
   d) the base having an underside that is parallel to the main locating surface.

2. The fixture adapter set-up according to claim 1 further comprising an adapter mountable to the base.

3. The fixture adapter set-up according to claim 2 wherein the adapter comprises a pivot location and comprises a cam pin, the cam pin for being rotated to pivot the adapter about the pivot location.

4. The fixture adapter set-up according to claim 1 further comprising multiple holes defined in the base for mounting the base to a machine.

5. The fixture adapter set-up according to claim 4 wherein the adapter further comprises a bolt hole and a plurality of fixture mounting holes.

6. The fixture adapter set-up according to claim 5 wherein the plurality of fixture mounting holes are for allowing a plurality of different fixtures to be mounted to the adapter.

7. The fixture adapter set-up according to claim 5 wherein the adapter is attachable and detachable from the base by an alignment bolt threaded through the threaded mounting hole defined in the base and the bolt hole in the adapter.

8. The fixture adapter set-up according to claim 7 wherein as the threaded bolt is tightened, the adapter first contacts the main locating surface, then the alignment surface, and finally the second solid surface.

9. A base and fixture adapter set-up comprising:
   a) a base;
   b) the base comprising a main locating surface, an alignment surface, and a second solid surface;
   c) the base defining a threaded mounting hole located in the main locating surface of the base, the threaded mounting hole at a compound angle;
   d) the base having an underside that is parallel to the main locating surface; and
   e) an adapter the adapter defining a bolt hole, the bolt hole aligns with the threaded mounting hole in the main surface of the base when the adapter and base are brought together, a bolt for holding the adapter and base together, and as the bolt is tightened the adapter first contacts the main locating surface, then the adapter contacts the alignment surface, and finally the adapter contacts the second solid surface.

10. A method of providing a fixture adapter set-up comprising the acts of:
   a) providing a base with an underside;
   b) providing the base with a main locating surface parallel to the underside of the base, an alignment surface, and a second solid surface; and
   c) defining a threaded hole in the main locating surface of the base, and setting the threaded hole at a compound angle.

11. A method of providing a fixture adapter set-up according to claim 10 further comprising the acts of defining multiple holes in the base for mounting the base to a machine.

12. A method of providing a fixture adapter set-up according to claim 10 further comprising the acts of providing an adapter releaseably attachable to the base.

13. A method of providing a fixture adapter set-up according to claim 12 further comprising the acts of defining a bolt hole and a plurality of fixture mounting holes in the adapter, the fixture mounting holes for allowing a plurality of different fixtures to be mounted to the adapter.

14. A method of providing a fixture adapter set-up according to claim 13 further comprising the acts of connecting the adapter to the base by moving a bolt through the bolt hole in the adapter an threading it to the threaded hole in the base.

15. A method of providing a fixture adapter set-up according to claim 14 further comprising the acts of tightening the threaded bolt.

16. A method of providing a fixture adapter set-up according to claim 15 wherein during the act of tightening the treaded bolt, the adapter first contacts the main locating surface, then the adapter contacts the alignment surface, and finally the adapter contacts the second solid surface.

* * * * *